United States Patent
Huang

(10) Patent No.: US 10,241,585 B2
(45) Date of Patent: Mar. 26, 2019

(54) SMART WATCH AND GESTURE INPUT METHOD FOR THE SMART WATCH

(71) Applicant: HuiZhou TCL Mobile Communication Co., Ltd., HuiZhou (CN)

(72) Inventor: Yanfeng Huang, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 120 days.

(21) Appl. No.: 15/308,612

(22) PCT Filed: Apr. 7, 2016

(86) PCT No.: PCT/CN2016/078635
§ 371 (c)(1),
(2) Date: Nov. 3, 2016

(87) PCT Pub. No.: WO2017/005023
PCT Pub. Date: Jan. 12, 2017

(65) Prior Publication Data
US 2017/0168583 A1    Jun. 15, 2017

(30) Foreign Application Priority Data
Jul. 8, 2015    (CN) .......................... 2015 1 0396300

(51) Int. Cl.
*G06F 3/01* (2006.01)
*G06F 1/16* (2006.01)

(52) U.S. Cl.
CPC .............. *G06F 3/017* (2013.01); *G06F 1/163* (2013.01); *G06F 1/1694* (2013.01)

(58) Field of Classification Search
CPC ................................. G06F 1/163; G06F 3/017
See application file for complete search history.

(56) References Cited

U.S. PATENT DOCUMENTS

| | | | |
|---|---|---|---|
| 9,703,386 B2 * | 7/2017 | Xu | G06F 3/017 340/5.51 |
| 2014/0184495 A1 * | 7/2014 | Quin | G06F 3/0487 345/156 |
| 2015/0123763 A1 * | 5/2015 | Xu | G08C 19/00 340/5.51 |
| 2015/0127965 A1 * | 5/2015 | Hong | H04L 9/3231 713/323 |

FOREIGN PATENT DOCUMENTS

| | | |
|---|---|---|
| CN | 102999296 | 3/2013 |
| CN | 103760970 | 4/2014 |
| CN | 103793075 | 5/2014 |
| CN | 105045391 | 11/2015 |

* cited by examiner

*Primary Examiner* — Afroza Chowdhury

(57) ABSTRACT

The present disclosure provides a smart watch and a gesture input method for the smart watch. The present disclosure starts to acquire data of gestures by receiving gestures of the user, collects the data of the gestures of a user at a continuous time section, and finds proximate text corresponding to the obtained data of the gestures from the prestored corresponding relationship between the data of the gestures and the text, namely the proximate text is final output text. The present disclosure can accurately obtain output text that the user need and meets the user requirement for the smart watch without changing size of a screen of the smart watch.

12 Claims, 3 Drawing Sheets

SMART WATCH AND GESTURE INPUT METHOD FOR THE SMART WATCH

RELATED APPLICATIONS

This application is a National Phase of PCT Patent Application No. PCT/CN2016/078635 having International filing date of Apr. 7, 2016, which claims the benefit of priority of Chinese Patent Application No. 201510396300.0 filed on Jul. 8, 2015. The contents of the above applications are all incorporated by reference as if fully set forth herein in their entirety.

BACKGROUND OF THE INVENTION

The present disclosure relates to the field of watches, and more particularly to a smart watch and a gesture input method for the smart watch.

As more and more user use smart watches, incoming calls, text messages, and notification alerts of the smart watches are more convenient and faster than incoming calls, text messages, and notification alerts of smart phones. However, because the smart watches are limited by size, thus, an input method for the smart watches is congenitally deficient, such as, text messages and emails cannot be replied completely on the smart watches. Although some current smart watches are used by voice input methods, which may be suitable for certain populations, but they may not be suitable for some people who are not allowed to speak. In the future, the smart watches will definitely support various input methods, just as current smart phones support various input methods to suit requirement of the user.

Therefore, prior art needs to be improved and developmental.

SUMMARY OF THE INVENTION

Based on deficiency of the prior art, the aim of the present disclosure is to provide a smart watch and a gesture input method for the smart watch capable of saving problem that the smart watch is inconvenient to input in prior art.

The technical scheme of the present disclosure is as follow:

The gesture input method for the smart watch, comprising the following steps:
 prestoring corresponding text corresponding to each data of gestures;
 obtaining an acceleration speed, a direction, and a duration of hand-movement of the user;
 determining input of gestures in progress by the user and starting to acquire data of the gestures when the duration of the hand-movement reaches a preset value;
 collecting data of the gestures of the user and a duration of gestures;
 recognizing the gestures of the user and converting the gestures of the user to corresponding text according to prestored corresponding relationship between the data of the gestures and the corresponding text;
 outputting the corresponding text corresponding to the gestures of the user.

In the gesture input method for the smart watch, a step for collecting the data of the gestures of the user and the duration of the gestures comprising: inputting the gestures at time1(t1), ending inputting of the gestures at time2(t2) that reaches a preset value, and saving the data of the gestures from t1 to t2; where the data of the gestures is continuous data of the gestures.

In the gesture input method for the smart watch, a step for recognizing the gestures of the user and converting the gestures of the user to corresponding text comprising: extracting the data of the gestures of the continuous time section from the obtained data of the gestures; obtaining proximate text corresponding to the data of the gestures of the continuous time section according to prestored corresponding relationship between the data of the gestures and the corresponding text.

In the gesture input method for the smart watch, the gesture input method for the smart watch further comprises: data of the gestures after t2 belongs to data of the gesture of a next duration.

The gesture input method for the smart watch, comprising the following steps:
 starting to acquire data of gestures according to gestures of user;
 collecting data of the gestures of the user and duration of gestures;
 recognizing the gestures of the user and converting the gestures of the user to corresponding text;
 outputting the corresponding text corresponding to the gestures of the user.

In the gesture input method for the smart watch, a step for starting to acquire data of gestures according to the gestures of user comprising:
 obtaining an acceleration speed, a direction, and a duration of hand-movement of the user;
 determining input of gestures in progress by the user and starting t to acquire the data of the gestures when the duration of the hand-movement reaches a preset value.

In the gesture input method for the smart watch, a step for collecting the data of the gestures of the user and the duration of the gestures comprising:
 inputting the gesture at time1(t1),
 ending inputting of the gesture at time2(t2) that reaches the preset value; and
 saving the data of the gestures from t1 to t2; where the data of the gestures is continuous data of the gestures.

In the gesture input method for the smart watch, the gesture input method for the smart watch further comprises: data of the gestures after t2 belongs to data of the gestures of a next duration.

In the gesture input method for the smart watch, a step before starting to acquire the data of the gestures according to the gestures of user comprising: prestoring the corresponding text corresponding to data of the gestures.

In the gesture input method for the smart watch, a step for recognizing the gestures of the user and converting the gestures of the user to corresponding text comprising: extracting the data of the gestures of the continuous time section from the obtained data of the gestures; obtaining proximate text corresponding to the data of the gestures of the continuous time section according to prestored corresponding relationship between the data of the gestures and the corresponding text.

The smart watch, comprising:
 starting module used to start acquire the data of the gestures according to the gestures of the user;
 collecting module used to collect the data of the gestures of the user and the duration of the gestures;
 recognizing module used to recognize the gestures of the user and convert the gestures of the user to the corresponding text; and outputting module used to output the corresponding text corresponding to the gestures.

In the smart watch, the starting module comprise a movement data acquisition unit used to obtain an acceleration speed, a direction, and a duration of hand-movement of the user, and a starting unit used to determine the input of gestures in process by the user and starting to acquire data of gestures when the duration of the hand-movement reaches a preset value.

In the collecting module of the smart watch, the gestures are input at time1(t1) and the input of the gestures is ended at time2(t2), length of the stop time after t2 reaches a preset value, the data of the gestures is saved from t1 to t2, where the data of the gestures is continuous data of the gestures.

In the smart watch, the smart watch further comprises gestures corresponding to the text module used to prestore the corresponding text corresponding to each data of the gestures.

In the smart watch, the recognizing module comprises a continuous gesture extracting unit used to extract the data of the gestures of the continuous time section from the obtained data of the gestures and a gesture and text converting unit used to obtain proximate text corresponding to the data of the gestures of the continuous time section according to prestored corresponding relationship between the data of the gestures and the corresponding text.

Advantageous effects of the present disclosure: the present disclosure starts acquire data of gestures by receiving gestures of the user, collects the data of the gestures of the user at the duration of the gestures, and finds proximate text corresponding to the obtained data of the gestures from the prestored corresponding relationship between the data of the gestures and the text, namely the proximate text is final output text. The present disclosure can accurately obtain output text that the user need and meets the user requirement for the smart watch without changing size of the screen of the smart watch.

DESCRIPTION OF SPECIFIC EMBODIMENTS OF THE INVENTION

The present disclosure provides a smart watch and a gesture input method for the smart watch. In order to more clearly illustrate the present disclosure or the technology of the present art, the present disclosure will further be described in detail. It should be understood that the present disclosure has been described with reference to certain preferred and alternative embodiments which are intended to be exemplary only and do not limit the full scope of the present disclosure.

Figure 1:
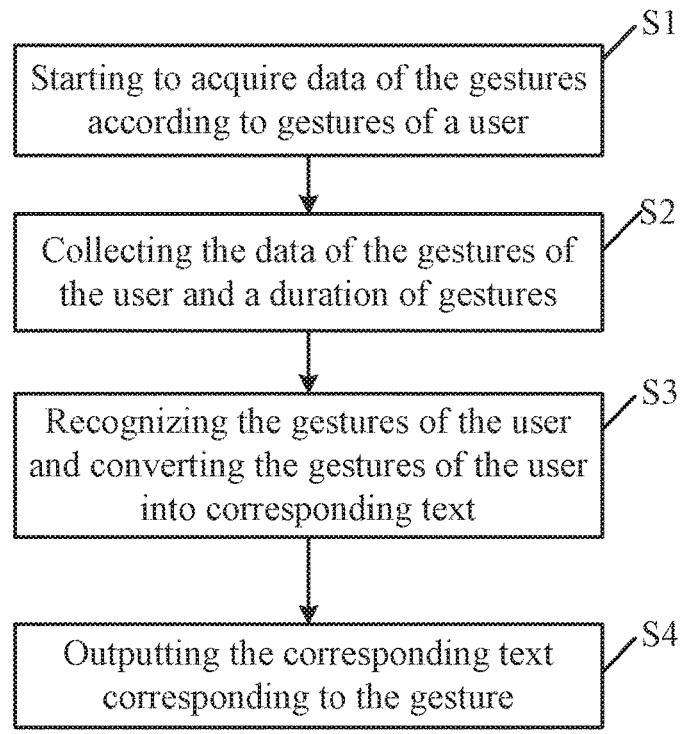
FIG. 1 is a flowchart of a gesture input method for a smart watch of an embodiment of the present disclosure.

As shown in FIG. 1, a gesture input method for the smart watch comprises the following steps:

step(S) 1: starting to acquire data of the gestures according to gestures of a user;

step(S) 2: collecting the data of the gestures of the user and a duration of gestures;

step(S) 3: recognizing the gestures of the user and converting the gestures of the user into corresponding text;

step(S) 4: outputting the corresponding text corresponding to the gestures.

The present disclosure provides the gesture input method for the smart watch. In specific operation, when the user makes the gestures, the data of the gestures is acquired and the data of the gestures is collected. The step for collecting the data of the gestures is according to the gestures of the user and records the duration of the gestures, which is convenient to count the start and end of a movement of gestures, and is further convenient to analyze the gestures. When the data of the gestures is obtained, the gestures of the user are analyzed and the corresponding text corresponding to the gestures is obtained and is output. Thus, the step for converting the gestures of the user to the corresponding text is achieved. The above method is achieved without the user needing to input text and changes a screen of the smart watch only when the user correspondingly makes the gestures, which is convenient to use for the user.

Figure 2:
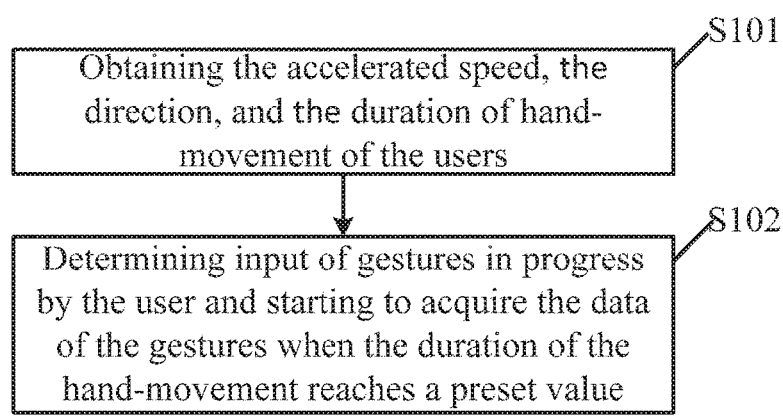
FIG. 2 is a flowchart of a step for starting to data of the gestures of the gesture input method for the smart watch of the embodiment of the present disclosure.

Furthermore, as shown in FIG. 2, FIG. 2 is a flowchart of the step (S)1 of the gesture input method for the smart watch of the embodiment of the present disclosure, where the S1 comprises:

Step(S) 101: obtaining an acceleration speed, a direction, and a duration of hand-movement of the user;

Step(S) 102: determining input of gestures in progress by the user and starting to acquire the data of the gestures when the duration of the hand-movement reaches a preset value.

The present disclosure provides the gesture input method for the smart watch: in the step that the smart watch starts to acquire the data of the gestures according to the gestures of the user, the acceleration speed, the direction, and the duration of the hand-movement of the user need to be obtained using a gravity sensor, a gyroscope, and a clock. Only when the duration of the gestures reaches a certain value, such as the duration of the gestures is 1 second, the user is input of the gestures in progress, the data of the gestures is acquired, and the data of the gestures is collected. The above method makes sure the data of the gestures is acquired only because the user need to start, and the data of the gestures is acquired not because of the user error operation, this causes consuming battery power and affecting the user use.

Furthermore, the gesture input method for the smart watch of the present disclosure comprises the S2, where the S2 comprises: inputting the gestures at time1(t1), ending inputting of the gestures at time2(t2) that reaches the preset value, and saving the data of the gestures from t1 to t2, where the data of the gestures is continuous data of the gestures.

In the gesture input method for the smart watch of the present disclosure, when the data of the gestures is collected, the start and the end of the gestures are confirmed, which is convenient to analyze the data of the gestures collected. Thus, the user starts inputting of the gestures at t1, and the user provisionally ends inputting of the gestures at t2, at the same time, it needs to determine length of stop time after t2. For example, the user ends inputting of the gestures at t2, and quickly starts inputting of the gestures again, the gestures after t2 and the gestures at t1 belong to the continuous gestures. Only when the user ends inputting of the gestures at t2, and the length of the stop time reaches a certain time, the input of the gestures at this time section is determined to end. Preferably, the length of the stop time after t2 exceeds 1 second, the data of the gestures from t1 to t2 is determined to be the continuous gestures, the data of the gestures after t2 belongs to a data of a next gesture at next time section, which makes analysis of the gestures at continuous time section accuracy.

Furthermore, the gesture input method for the smart watch of the present disclosure further comprises step(S) 0 before the S1: prestoring the corresponding text corresponding to each data of the gestures.

In the gesture input method for the smart watch of the present disclosure, first, corresponding relationship between the data of the gestures and the text is prestored before the step for collecting the data of the gestures and the step for starting to acquire the data of the gestures. Namely, it should be determined that one gesture correspondingly stands for one corresponding text, when the data of the gestures is analyzed, proximate corresponding relationship between the data of the gestures and the text is obtained by referring to the corresponding relationship, which increases accuracy rate of outputting the text.

Figure 3:
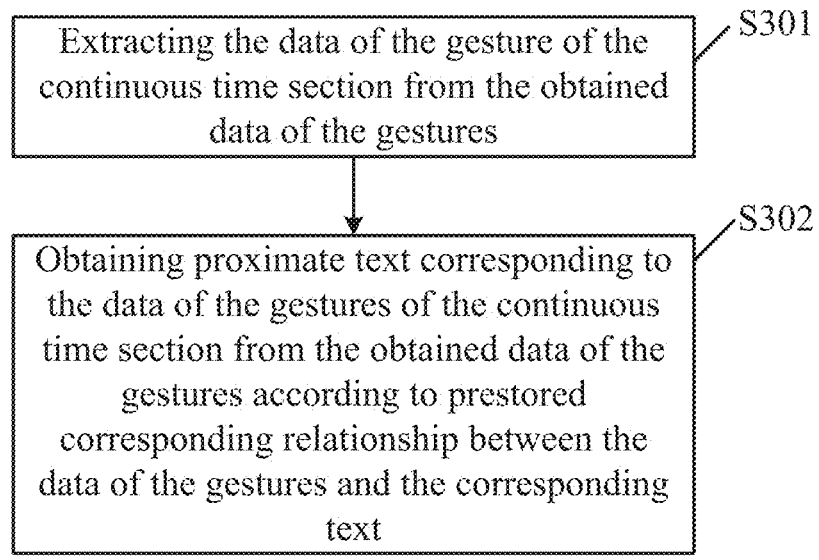
FIG. 3 is a flowchart of a step for converting gestures to text of the gesture input method for the smart watch of the embodiment of the present disclosure.

Furthermore, as shown in FIG. 3, FIG. 3 is a flowchart of the step 3 of the embodiment of the present disclosure, where the step 3 comprises:

Step(S) 301: extracting the data of the gesture of the continuous time section from the obtained data of the gestures;

Step(S) 302: obtaining proximate text corresponding to the data of the gestures of the continuous time section from the obtained data of the gestures according to prestored corresponding relationship between the data of the gestures and the corresponding text.

In the gesture input method for the smart watch of the present disclosure, the step is that the corresponding text is obtained according to analyze the data of the gestures, first, the data of the gestures of the continuous time section is extracted from the obtained data of the gestures, continuous input of the gestures can ensure accuracy of the corresponding text corresponding to the gestures. The proximate text corresponding to the extracted the data of the gestures of the continuous time section is found from the prestored corresponding relationship in the smart watch, namely the proximate text is final output text. Even though current high-end input of the gestures cannot ensure that the accuracy rate of the gestures corresponding to the text is 100%, which certainly shows error. Thus, the present disclosure improves accuracy of the text corresponding to the gestures as much as possible.

Figure 4:
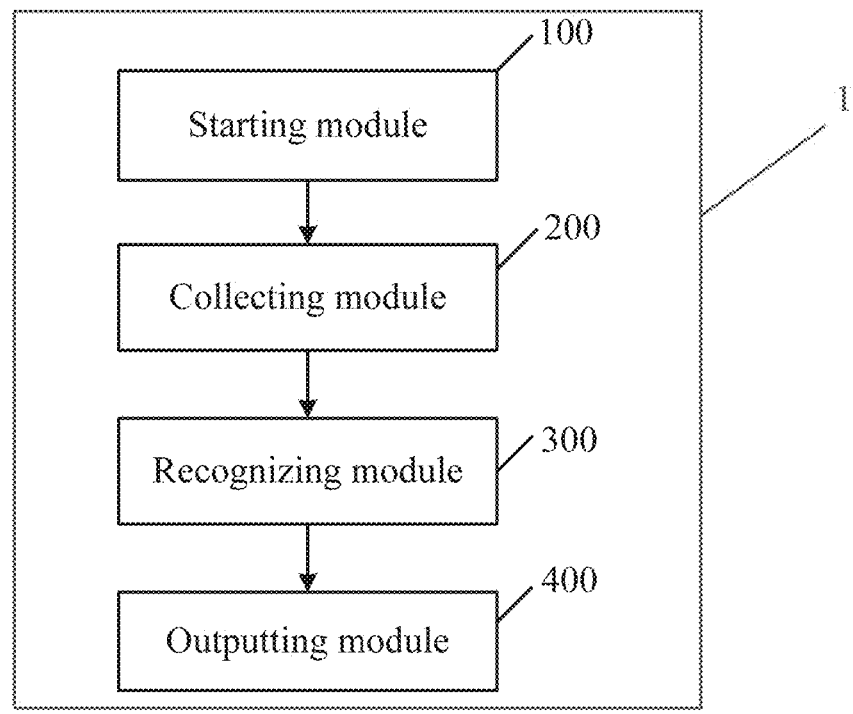
FIG. 4 is a structural block diagram of the smart watch of the embodiment of the present disclosure.

Furthermore, the present disclosure further provides the smart watch, as shown in FIG. 4, the FIG. 4 is a structural block diagram of the smart watch, where the smart watch comprises:

a starting module 100 used to start to acquire the data of the gestures according to the gestures of the user;

a collecting module 200 used to collect the data of the gestures of the user and the duration of the gesture;

a recognizing module 300 used to recognize the gestures of the user and convert the gestures of the user to the corresponding text; and an outputting module 400 used to output the corresponding text corresponding to the gestures.

Function of each module of the smart watch of the present disclosure has been described in detail as the above the steps of the gesture input method, thus, there will not be described.

Figure 5:
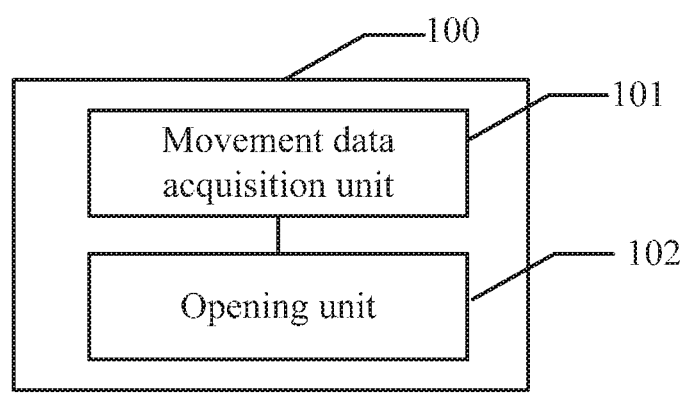
FIG. 5 is a structural block diagram of a starting module of the smart watch of the embodiment of the present disclosure.

Furthermore, as shown in FIG. 5, FIG. 5 is a structural block diagram of the starting module of the smart watch of the embodiment of the present disclosure, where the starting module 100 comprises a movement data acquisition unit 101 used to obtain the acceleration speed, the direction, and the duration of hand-movement of the user, and the starting unit 102 used to determine the input of the gestures in process by the user and starting to acquire the data of the gestures when the duration of the hand-movement reaches the preset value.

Furthermore, in the collecting module 200 of the smart watch, the gestures are input at t1(time1) and the input of the gestures is ended at t2 (time2), length of the stop time after t2 reaches the preset value, the data of the gestures is saved from t1 to t2, where the data of the gestures is continuous data of the gesture.

Furthermore, the smart watch further comprises the gestures corresponding to the text module 500 used to prestore the corresponding text corresponding to each data of the gestures.

Figure 6:
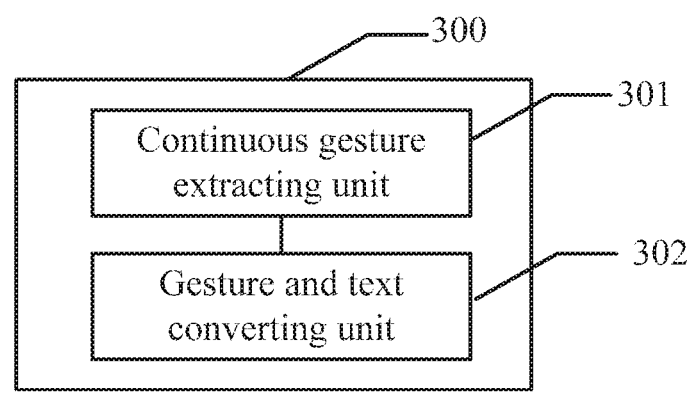
FIG. 6 is a structural block diagram of a recognizing module of the smart watch of the embodiment of the present disclosure.

Furthermore, as shown in FIG. 6, FIG. 6 is a structural block diagram of the recognizing module of the smart watch of the embodiment of the present disclosure, where the recognizing module comprises:

a continuous gesture extracting unit 301 used to extract the data of the gesture of the continuous time section from the obtained data of the gestures;

a gesture and text converting unit 302 used to obtain proximate text corresponding to the data of the gestures of the continuous time section from the obtained data of the gestures according to prestored corresponding relationship between the data of the gestures and the text.

In conclusion, the present disclosure starts the gesture data acquisition by receiving the gestures of the user, collect the data of the gestures of the user at the continuous time section, and find the proximate text corresponding to the obtained data of the gestures from the prestored corresponding relationship between the data of the gestures and the text, namely the proximate text is final output text. The smart watch and the gesture input method for the smart watch of the present disclosure can accurately obtain output text that the user need and meets the user requirement for the smart watch without changing size of the screen of the smart watch.

The above smart watch and the gesture input method for the smart watch belong to same design, the smart watch can operate any method of the gesture input method for the smart watch, the specific realization process has been described in detail as the above the gesture input method for the smart watch, thus, there will not be described.

It should be noted: for the gesture input method for the smart watch, a person skilled in the art should understand and achieve that all or part process of the gesture input method for the smart watch of the embodiment of the present disclosure are controlled by computer program to complete. The computer program may be stored in a computer readable storage medium, such as the computer program is stored in a memory of the smart watch, and the computer program is performed by at least one processor in the smart watch, which includes any above method of the embodiment of the present disclosure in the performing. The computer readable storage medium is a diskette, an optical disk, a read-only memory, or a random access memory and so on.

For the gesture input method for the smart watch, different modules may integrate in one processing chip or may exit as separate physical presence. Or two or more modules integrate in one module. The above integrate module can use hardware to achieve and also use software function module to achieve. If the integrate module uses software function module to achieve and is as standalone product to sell or use, the integrate module may store in the computer readable storage medium, where the computer readable storage medium is the read-only memory, the diskette, or the optical disk and so on.

It should be understood that present disclosure is not limited to the exemplary examples. Person skilled in the art should understand and achieve that equivalent replacement and improvement is according to the above description. The equivalent replacements and improvements should be considered to belong to the protection scope of the present disclosure

The invention claimed is:

1. A gesture input method for a smart watch, the smart watch comprising a processor, and a memory connected with the processor; the gesture input method comprising the following steps:
prestoring corresponding text corresponding to data of gestures in the memory;
obtaining, by the processor, an acceleration speed, a direction, and a duration of a hand-movement of a user;
determining that input of gestures is executed by the user and acquiring the data of the gestures when the duration of the hand-movement reaches a preset value;
collecting, in the memory, the data of the gestures of the user and a duration of gestures, inputting the gestures at time1 (t1), ending inputting of the gestures at time2 (t2) that reaches the preset value, and saving the data of the gestures from t1 to t2; wherein the data of the gestures is continuous data of the gestures;
wherein the data of the gestures is continuous;
recognizing, in the processor, the gestures of the user and converting the gestures of the user into corresponding text according to a corresponding relationship between the data of the gestures and the corresponding text prestored in the memory;
outputting the corresponding text corresponding to the gestures of the user.

2. The gesture input method for the smart watch as claimed in claim 1, a step for recognizing the gestures of the user and converting the gestures of the user to the corresponding text comprises:
extracting the data of the gestures of a continuous time section from the collected data of the gestures;
obtaining proximate text corresponding to the data of the gestures of the continuous time section according to prestored corresponding relationship between the data of the gestures and the corresponding text.

3. The gesture input method for the smart watch as claimed in claim 1, further comprising: the data of the gestures after t2 belongs to data of gestures of a next duration.

4. A gesture input method for a smart watch, the smart watch comprising a processor, and a memory connected with the processor; the gesture input method comprising the following steps: acquiring data of gestures according to gestures of a user;
collecting, in the memory, the data of the gestures of the user and duration of gestures; inputting the gestures at time1(t1), ending inputting of the gestures at time2(t2) that reaches the preset value, and saving the data of the gestures from t1 to t2; wherein the data of the gestures is continuous data of the gesture;
recognizing, by the processor, the gestures of the user and converting the gestures of the user into corresponding text;
outputting, by the processor, the corresponding text corresponding to the gestures of the user.

5. The gesture input method for the smart watch as claimed in claim 4, a step for acquiring the data of the gestures according to the gestures of user comprising:
obtaining, by the processor, an acceleration speed, a direction, and a duration of hand-movement of the user;
determining, by the processor, input of gestures in progress by the user and acquiring the data of the gestures when the duration of the hand-movement reaches a preset value.

6. The gesture input method for the smart watch as claimed in claim 4, further comprising: the data of the gesture after t2 belongs to data of gestures of a next duration.

7. The gesture input method for the smart watch as claimed in claim 4, a step before acquiring the data of the gestures according to the gestures of user comprising: prestoring the corresponding text corresponding to the data of the gestures.

8. The gesture input method for the smart watch as claimed in claim 4, a step for recognizing the gestures of the user and converting the gestures of the user to corresponding text comprising:
extracting the data of the gestures of a continuous time section from the collected data of the gestures;
obtaining proximate text corresponding to the data of the gestures of the continuous time section according to prestored corresponding relationship between the data of the gestures and the corresponding text.

9. A smart watch, comprising:
a processor and a memory connected with the processor;
wherein non-transitory computerized programs are stored in the memory and configured to be executed by the processor to perform a method, the method comprising:
acquiring data of gestures according to gestures of a user;
collecting the data of the gestures of the user and duration of the gestures; the gestures are input at time1(t1) and the input of the gestures are ended at time2(t2), length of the stop time after t2 reaches a preset value, the data of the gestures is saved from t1 to t2, wherein the data of the gestures is continuous data of the gestures;
recognizing the gestures of the user and convert the gestures of the user to the corresponding text; and
outputting the corresponding text corresponding to the gestures.

10. The smart watch as claimed in claim 9, wherein the method further comprises: obtaining an acceleration speed, a direction, and a duration of hand-movement of the user, and determining input of the gestures in process by the user and acquiring the data of the gestures when the duration of the hand-movement reaches a preset value.

11. The smart watch as claimed in claim 9, the smart watch further comprises a gesture corresponding to the text module used to prestore the corresponding text corresponding to the data of the gestures.

12. The smart watch as claimed in claim 9, wherein the method further comprises: extracting the data of the gestures of a continuous time section from the collected data of the gestures, obtaining proximate text corresponding to the data of the gestures of the continuous time section according to prestored corresponding relationship between the data of the gestures and the corresponding text.

* * * * *